United States Patent
Tai et al.

(10) Patent No.: US 7,225,357 B2
(45) Date of Patent: May 29, 2007

(54) SDIO CARD DEVELOPMENT SYSTEM

(75) Inventors: Ping Huei Tai, Cupertino, CA (US); Katsuhiro Hirayama, Yokohama (JP)

(73) Assignee: Zentek Technology Japan, Inc., Tokyo (JP)

( * ) Notice: Subject to any disclaimer, the term of this patent is extended or adjusted under 35 U.S.C. 154(b) by 459 days.

(21) Appl. No.: 10/759,213

(22) Filed: Jan. 20, 2004

(65) Prior Publication Data
US 2004/0202015 A1 Oct. 14, 2004

Related U.S. Application Data

(60) Provisional application No. 60/441,134, filed on Jan. 21, 2003.

(51) Int. Cl.
*G06F 11/00* (2006.01)
(52) U.S. Cl. .............. 714/25; 714/30; 714/31; 714/48; 717/124; 324/765
(58) Field of Classification Search .............. 714/25, 714/30, 31, 48; 717/125, 124; 324/765
See application file for complete search history.

(56) References Cited

U.S. PATENT DOCUMENTS

| | | | | |
|---|---|---|---|---|
| 5,754,760 A | * | 5/1998 | Warfield | 714/38 |
| 6,407,940 B1 | * | 6/2002 | Aizawa | 365/52 |
| 6,466,007 B1 | * | 10/2002 | Prazeres da Costa et al. | 324/158.1 |
| 6,591,069 B2 | * | 7/2003 | Horiguchi | 396/429 |
| 6,615,390 B1 | * | 9/2003 | Takagi | 716/1 |
| 6,820,047 B1 | * | 11/2004 | Aizawa et al. | 703/14 |
| 6,826,747 B1 | * | 11/2004 | Augsburg et al. | 717/128 |
| 6,938,244 B1 | * | 8/2005 | Perlin et al. | 717/125 |
| 6,993,748 B2 | * | 1/2006 | Schaefer | 717/124 |
| 2002/0116668 A1 | * | 8/2002 | Chhor et al. | 714/42 |

OTHER PUBLICATIONS

Microsoft Computer Dictionary, 1999, Microsoft Press, 4th ed., pp. 324.*

* cited by examiner

*Primary Examiner*—Robert W. Beausoliel
*Assistant Examiner*—Emerson Puente
(74) *Attorney, Agent, or Firm*—Griffin & Szipl, P.C.

(57) ABSTRACT

An SDIO card development supporting system for development of SDIO cards, an SDIO controller reference board, and a method for running the system are disclosed. The SDIO card development supporting system includes: (a) a hardware component comprising: (i) a platform equipped with an operating system and a memory operably connected to the operating system; (ii) an SD host board including an SDIO host device; and (iii) an SD bus operably connecting the operating system of the platform to the SD host board; and (b) a software component stored in the memory of the platform, wherein the software component comprises an SDIO test program that runs on the operating system of the platform.

16 Claims, 7 Drawing Sheets

SD-IDE FLOW CHART

SDIO INITIALIZATION ENGINE

SDIO COMMAND PROCESS ENGINE

SDIO STATE MACHINE ENGINE

SDIO TRANSACTION RECORD ENGINE

SDIO SCRIPTING ENGINE

SDIO PARSING/ANALYZING ENGINE

SDIO DEBUGGER ENGINE

SDIO CARD DEVELOPMENT SYSTEM

This application claims priority on U.S. Provisional Application No. 60/441,134, filed on Jan. 21, 2003, and which is incorporated herein in its entirety by reference.

FIELD OF THE INVENTION

The present invention relates to a comprehensive development tool for SDIO cards compliant with the Secure Digital Input Output (abbreviated "SDIO") standard.

BACKGROUND OF THE INVENTION

There are a variety of standards for integrated circuit (IC) cards that can be mounted on mobile devices such as notebook personal computers (PC), personal digital assistants (PDA), digital video devices, digital cameras, and portable audio devices. These mobile devices will be referred to collectively as "host devices." Recently, SD memory cards have been attracting attention because of their small size, high data transfer rates, and enhanced security features. For the purposes of this disclosure, the abbreviation "SD" stands for "secure digital," and various devices and their components related to this secure digital technology may be identified by the abbreviation "SD."

At present, there are two international standards for SD-related devices: (1) the SD memory standard for memory devices and, (2) the SDIO standard for input/output (I/O) devices. The SDIO standard is an extension of the SD memory card standard and covers input/output (I/O) functions as well as memory functions. Card-shaped peripherals compliant with the SDIO standard are referred to as "SDIO cards." In order to develop or engineer an SDIO card, it is necessary to understand much of the SD and SDIO standards, to prepare appropriately designed environments, and to examine test environments and processes before tackling the solving of various problems including interface application issues.

An SDIO controller in accordance with the present invention is defined as a controller that implements functions needed for peripherals to comply with the SDIO standard and to connect to SDIO host devices. Those skilled in the art know that SDIO is a relatively new standard in industry technology. In view of this fact, future research and development must be conducted in such a way as to meet the specifications of the SDIO international standard. Because SDIO is a newly emerging technology, environments for SDIO-related design and development are not yet in place. Thus, certain necessary hardware devices for SD interfaces and associated software await development. For example, SDIO protocol engines, which would be SDIO compatible host interface modules (abbreviated as "SDIO HIM") for providing communication interfaces between SDIO compatible peripherals and SDIO host devices, and the associated software, have not yet been developed.

Consequently, in order to construct new SDIO systems, engineers must determine whether various SDIO peripheral application devices, such as SD memory cards, SD wireless cards, global positioning systems (GPS), etc., will operate properly on certain pre-existing consumer host systems (e.g., digital video cameras, etc.) undergoing SDIO modification when mounting an SDIO-compatible host controller chip on such pre-existing consumer host systems to make them compatible with SDIO peripherals. More specifically, device driver software for the host systems needs to be developed, and the SDIO modified host systems must be systematically verified for compliance with the SDIO standard, and so on.

On the other hand, engineers of SDIO application devices (i.e., SD memory cards, SD wireless cards, GPS, other types of wireless communication peripherals, etc.) must determine whether newly engineered SDIO cards operate properly for various SDIO host devices. In this case, development of these SDIO application devices themselves, and their corresponding device driver software, is indispensable.

In view of the above SDIO technology development problems, a major object in accordance with the present invention is to improve the design and development environments for SDIO-related devices so as to facilitate the future engineering of SDIO-compatible devices. Another object in accordance with the present invention is to provide a development tool that can reduce burdens on development engineers in various technological fields, which can speed up the development time of SDIO card development systems and make such systems more efficient. Another object in accordance with the present invention is to provide a development tool for SDIO technology that facilitates development and engineering of SDIO-compatible devices through the use of more efficient design and development environments.

SUMMARY OF THE INVENTION

The present invention provides an SDIO card development supporting system, which includes: a hardware configuration in which a computer (11) equipped with an operating system serving as a platform is connected via a bus with a host board (13) containing a SDIO host device; and a SDIO test program (abbreviated "SD-IDE") with the software running on the operating system wherein the SDIO test program provides the capability to generate commands, analyze commands, trace commands, and perform debugging for the SD host, as well as a scripting capability to describe these commands and the debugging operation.

The SDIO card development supporting system, in accordance with the present invention, makes it possible to keep track of the state of the SDIO host device on the computer, and thus facilitates card recognition tests and data write/read tests to/from an SDIO card connected to the computer when the SDIO card is inserted into, and connected with, the SDIO host device.

An SDIO card development supporting system in accordance with the present invention also provides an SDIO controller reference board (15*a*) equipped with an SDIO port for connecting to the SDIO host via an SD bus, which includes: an SDIO controller (21) equipped with a plurality of application interfaces on a substrate (20); a quartz oscillator (22) for operating the SDIO controller (21); and a plurality of application interface ports (24, 25) connected to the controller (21).

Preferably, one of the application interfaces is a memory interface to which at least one of an electrically erasable programmable read-only memory (EEPROM), a NAND-type flash memory, or a NOR-type flash memory, is connected. Both this memory interface and the associated memory selected from the group consisting of the EEPROM, NAND-type flash memory, and NOR-type flash memory are mounted on the substrate (20).

The reference board can receive commands and data from the SDIO host device and return a response as does an actual SDIO card. Thus, the SDIO reference board can be treated just like an inserted SDIO card when it is connected to the SDIO host because the reference board simulates a model SDIO card. Consequently, during SDIO host device prototype development and evaluation, the reference board of the present invention can be used as if it were an actual card. In other words, the reference board operates to provide a "test" SDIO card so the operation of the component SDIO system engineered into the SDIO host device can be tested for compliance with SDIO standards.

Also, the SDIO card development supporting system in accordance with the present invention can be provided with compliance checking capabilities for checking whether an SDIO card module satisfies the SDIO standard. Specifically, when operation tests are conducted by incorporating test scenarios and expected values for individual items, (e.g., by simulating application software based on SDIO compliance test procedures stipulated by the SDIO standard specification), it is possible to test whether the SDIO standard is satisfied by the components of the SDIO card module.

Furthermore, the SDIO card development supporting system in accordance with the present invention can be applied to product inspection devices used during mass production of SDIO card modules and used in inspection methods. For example, one inspection method involves providing system hardware with two SDIO card test slots, inserting a nondefective card into one test slot and a card to be tested into the other test slot, sending the same test vectors to both test slots, storing histories of responses and various data, and making comparisons serially, or later. Furthermore, it is possible to practice the SDIO card development supporting system in accordance with the present invention by utilizing three or more SDIO card test slots so as to be able to test multiple cards efficiently.

Thus, the SDIO card development supporting system in accordance with the present invention permits tracking how an entire SDIO card system, consisting of the SDIO host device, the SDIO controller, and the SDIO reference board device, is operating. The SDIO card development supporting system in accordance with the present invention also permits analyzing of system operation, verifying the system operation, and maintaining close communication with SDIO drivers and the target drivers.

The SDIO card development supporting system in accordance with the present invention facilitates design and development of SDIO application cards and SDIO memory cards. Without the SDIO card development supporting system in accordance with the present invention, it would take a lot more man-hours to constantly monitor relevant standards, which could be changed, and to reflect any additions or changes needed in the SDIO cards. Consequently, the man-hours needed for engineering, design and development of SDIO-related devices is affected greatly. Advantageously, the SDIO card development supporting system in accordance with the present invention reflects the latest changes in technological standards, and so it provides improved design and development environments.

In order to effectuate the advantages described above, the present invention provides a first apparatus embodiment, which is an SDIO card development supporting system for development of SDIO cards, the system including: (a) a hardware component comprising: (i) a platform equipped with an operating system and a memory operably connected to the operating system; (ii) an SD host board including an SDIO host device; and (iii) an SD bus operably connecting the operating system of the platform to the SD host board; and (b) a software component stored in the memory of the platform, wherein the software component comprises an SDIO test program that runs on the operating system of the platform.

In a second apparatus embodiment in accordance with the present invention, the first apparatus embodiment is further modified so that the platform is a computer. In a third apparatus embodiment in accordance with the present invention, the first apparatus embodiment is further modified so that the hardware component further comprises an SDIO controller reference board equipped with an SDIO port operably connectable to the SDIO host device via the SD bus.

In a fourth apparatus embodiment in accordance with the present invention, the third apparatus embodiment is further modified so that the reference board comprises: a substrate; an SDIO controller disposed on the substrate and equipped with a plurality of application interfaces; a quartz oscillator operably connected to the SDIO controller; and a plurality of application interface ports operably connected to the SDIO controller. In a fifth apparatus embodiment in accordance with the present invention, the fourth apparatus embodiment is further modified so that the SDIO controller further comprises a host interface module that operably connects the SDIO controller to the SD bus when the SDIO port is operably connected to the SDIO host device. In a sixth apparatus embodiment in accordance with the present invention, the fifth apparatus embodiment is further modified so that the plurality of application interfaces includes a HS-UART interface and a PCMCIA interface, and the plurality of application interface ports includes a HS-UART connector and a PCMCIA connector, wherein the HS-UART interface is operably connected to the HS-UART connector and the PCMCIA interface is operably connected to the PCMCIA connector.

In a seventh apparatus embodiment in accordance with the present invention, the first apparatus embodiment is further modified so that the SDIO test program operates to generate commands, analyze commands, trace commands, and perform debugging for the SD host device. In a seventh apparatus embodiment in accordance with the present invention, the eighth apparatus embodiment is further modified so that the SDIO test program also operates a language script interpreter in order to describe generated commands, analyzed commands, traced commands, and debugging performed by the SDIO test program. In a ninth apparatus embodiment in accordance with the present invention, the first apparatus embodiment is further modified so that the SDIO test program comprises: a command generator; a command analyzer; a tracer; and a language script interpreter.

The present invention also includes a tenth apparatus embodiment, which provides an SDIO controller reference board equipped with an SDIO port operably connectable to an SDIO host device via an SD bus, the reference board including: (a) a substrate; (b) an SDIO controller disposed on the substrate and equipped with a plurality of application interfaces; (c) a quartz oscillator operably connected to the SDIO controller; and (d) a plurality of application interface ports operably connected to the SDIO controller.

In accordance with an eleventh embodiment of the invention, the tenth apparatus embodiment is further modified so that the SDIO controller further comprises a host interface module that operably connects the SDIO controller to the SD bus when the SDIO port is operably connected to the SDIO host device. In accordance with a twelfth embodiment of the invention, the eleventh apparatus embodiment is further modified so that the SDIO controller further comprises a memory interface, and the reference board further comprises one or more memory units operably connected to the memory interface. In accordance with a thirteenth embodiment of the invention, the twelfth apparatus embodiment is further modified so that the one or more memory units are selected from the group consisting of an I$^2$C serial EEPROM unit, a NAND-type flash memory and a NOR-type flash memory. In accordance with a fourteenth embodiment of the invention, the twelfth apparatus embodiment is further modified so that each application interface of the SDIO controller is operably connected to a respective one of the plurality of application interface ports. In accordance with a fifteenth embodiment of the invention, the fourteenth apparatus embodiment is further modified so the plurality of application interfaces includes a HS-UART interface and a PCMCIA interface, and the plurality of application interface ports includes a HS-UART connector and a PCMCIA connector, wherein the HS-UART interface is operably connected to the HS-UART connector and the PCMCIA interface is operably connected to the PCMCIA connector.

The present invention also provides a first method embodiment, which is a method of operating an SDIO card development supporting system, wherein the system comprises an SD integrated development environment software program operating on a computer platform and the computer platform comprises a memory storing the software program and a SDIO host device, the method comprising the steps of: (a) starting the SDIO card development supporting system using the software program and optionally checking a work environment; (b) launching one or more engines of the software program; (c) initializing the system using the software program when an SDIO card unit having an SDIO controller is inserted into an SDIO slot of the computer platform so as to operably connect the SDIO controller to the SDIO host device; and (d) generating an SDIO command using the software program in order to test the operable connection between the SDIO host device and the SDIO controller.

In accordance with a second method embodiment of the present invention, the first method embodiment is modified so that the software program comprises an SDIO initialization engine and a SDIO command process engine, and initializing the system is performed by the SDIO initialization engine and generating the SDIO command is performed by the SDIO command process engine. In accordance with a third method embodiment of the present invention, the first method embodiment is further modified to include the steps of: (e) comparing behavior of the SDIO controller of the SDIO card unit to behavior of an ideal SDIO controller stored in memory of the computer platform; and (f) generating an error signal when a difference between the behavior of the SDIO controller of the SDIO card unit and the behavior of the ideal SDIO controller is detected. In accordance with a fourth method embodiment of the present invention, the first method embodiment is modified so the operable connection between the SDIO host device and the SDIO controller is provided by an SD bus of the computer platform, and the method further comprises the steps of: (e) recording a transaction history of packets supported by the bus; and (f) parsing and analyzing the transaction history in order to debug the software program when the SDIO card unit is a SDIO controller reference board. In accordance with a fifth method embodiment of the present invention, the first method embodiment is modified so the operable connection between the SDIO host device and the SDIO controller is provided by an SD bus of the computer platform, and the method further comprises the steps of: (e) recording a transaction history of packets supported by the bus; and (f) parsing and analyzing the transaction history in order to debug the SDIO card unit when the SDIO card unit is an actual SDIO card.

The SDIO design and development system and reference board in accordance with the present invention also provides an efficient application development environment, making it possible to carry out development processes consistently and reliably from an SDIO host through to target applications engineered to be compatible with SDIO technology.

Further objects, features and advantages of the present invention will become apparent from the detailed Description of the Illustrative Embodiments, which follows, when considered together with the attached drawings.

DESCRIPTION OF REFERENCE NUMERALS

Figure 1A:
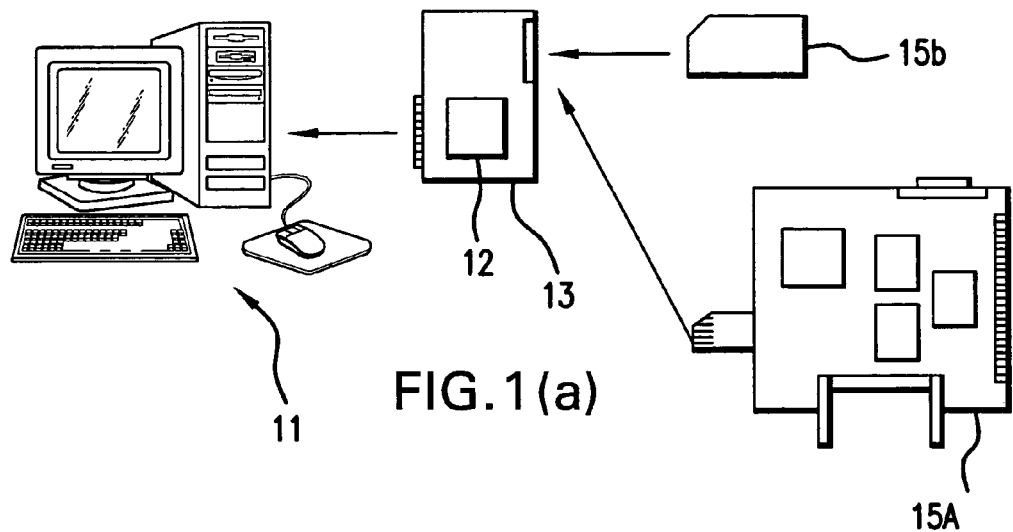
FIG. 1a shows a computer system incorporating the SDIO card development supporting system in accordance with one embodiment of the present invention.

11 Computer
12 SDIO host device (i.e., SDIO host controller chip)
13 SDIO host board
14 SDIO connector or socket
15 Reference board
16 SDIO controller
17 Memory interface
18 Interface to external module
19 External module (also referred to as a "target device")
20 Reference board
21 SDIO controller
22 Quartz oscillator (also known as the "clock")
23 Memories
24 UART connector
25 PCMCIA connector or socket 26 GPIO connector of the Reference Board
27 GPIO connector of the SD Host Card
28 GPIO connector of target device (optional)

DESCRIPTION OF THE ILLUSTRATIVE EMBODIMENTS

First, the basic non-limiting illustrative configurations of the apparatus embodiments in accordance with the present invention will be described below with reference to the drawings, where like reference numerals refer to like parts. Then, the method embodiments in accordance with the present invention will also be described with reference to the drawings.

The Illustrative Apparatus Embodiments

Figure 1B:
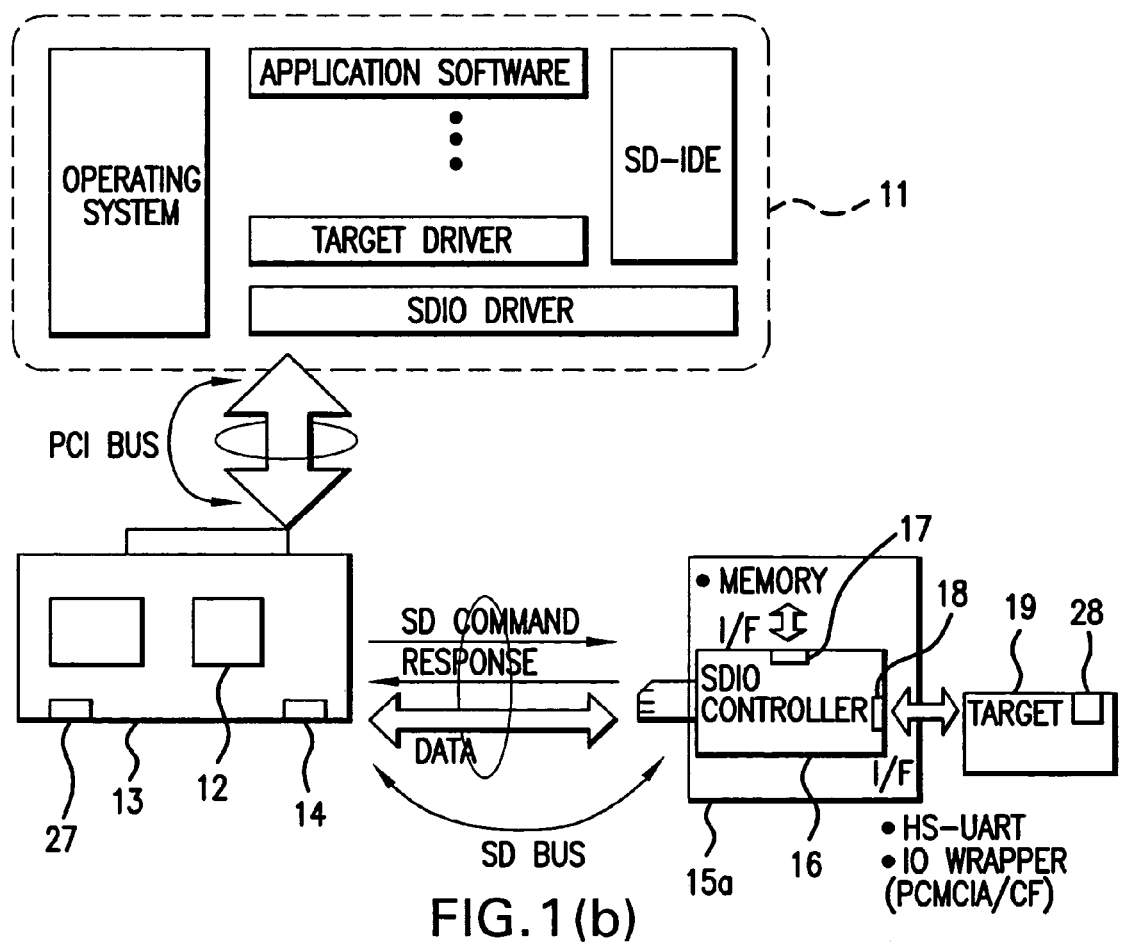
FIG. 1b is a schematic diagram showing the overall configuration of an SDIO card development supporting system in accordance with an embodiment of the present invention.

The overall configuration of the hardware component of the SDIO card development supporting system is described with reference to FIGS. 1a and 1b. FIG. 1a shows a computer 11 equipped with an expansion bus slot (e.g., a PCI bus) so that the SDIO host board 13 containing the SDIO host device 12 is connected via the PCI bus to the computer 11. The PCI bus is the expansion bus. In accordance with the present invention, the expansion bus is not limited to being a PCI bus. As shown in FIG. 1b, the SD host board 13 is equipped with the SDIO connector 14, which connects with the SDIO reference board 15a via an SD bus. Of course, the SDIO connector 14 is also dimensioned to connect instead with an SDIO card 15b. The SD host board 13 may be provided with a General Peripheral I/O (GPIO) connector 27 of the SD host PCI adapter.

The reference board 15a is equipped with an SDIO controller 16 that has the memory interface (abbreviated M-I/F) 17 as well as the application interface 18. The M-I/F 17 connects the SDIO controller 16 to a memory device contained within SDIO reference board 15a. The application interface 18 allows an external module 19, (also referred to as a "target device"), to be connected to the reference board 15a. The target device 19 may include a GPIO connector 28 for connecting to the GPIO connector 26 of the reference board.

By operating an SDIO test program (abbreviated "SD-IDE") on the computer platform (i.e., computer 11), the developer can carry out various tests and evaluations on the SDIO host device, which in this case is computer 11, or on the SDIO controller 16 of reference board 15a, or on the SDIO controller of an actual SDIO card 15b. In this manner, the reference board 15a simulates an actual SDIO card 15b. For the purposes of this disclosure, an actual SDIO card 15b and the reference board 15a can be generally referred to as "SDIO card units" since they both operate as SDIO cards.

As mentioned above, instead of the reference board 15a, a target SDIO application card 15b, or a target SDIO memory card, may be inserted directly into the SDIO slot 14 of the SDIO host board 13. When this direct connection between the host board 13 and an SDIO card 15b is made, connection tests can be conducted between the SDIO host board 13 connected to computer 11 and the SDIO controller of the SDIO card 15b.

Thus, an SDIO card development supporting system, in accordance with the present invention, for developing SDIO cards is an apparatus assembly that includes the following components: (a) a platform (i.e., computer 11); (b) an SD host board 13 connected to the platform via a first expansion bus (i.e., a PCI bus); and (c) a reference board 15a or 20, which is connected to the SD host board 13 via a SD bus. More specifically, a platform suitable for use in the present invention would be a computer system (i.e., a computer platform), which includes a central processing unit (CPU), operating system software, and etc. for operating applications, including SDIO applications. The platform used in the present invention is equipped with a second expansion bus slot, or other connection means, for mounting and operating the SD host controller. An SD host board 13 suitable for use in the present invention is equipped with an SDIO host device 12, which is mounted and connected to the computer platform via the second expansion bus. By using these platform and SD host board components of the assembly forming the SDIO card development supporting system, a developer can start the SDIO test program (abbreviated "SD-IDE") stored in the memory of the platform (i.e., the memory of a computer). The SD-IDE program works from the platform and enables SDIO functions now connected to the host device 12 to be operated in conjunction with the reference board 15b via the host device 12 and the SD bus.

Figure 2:
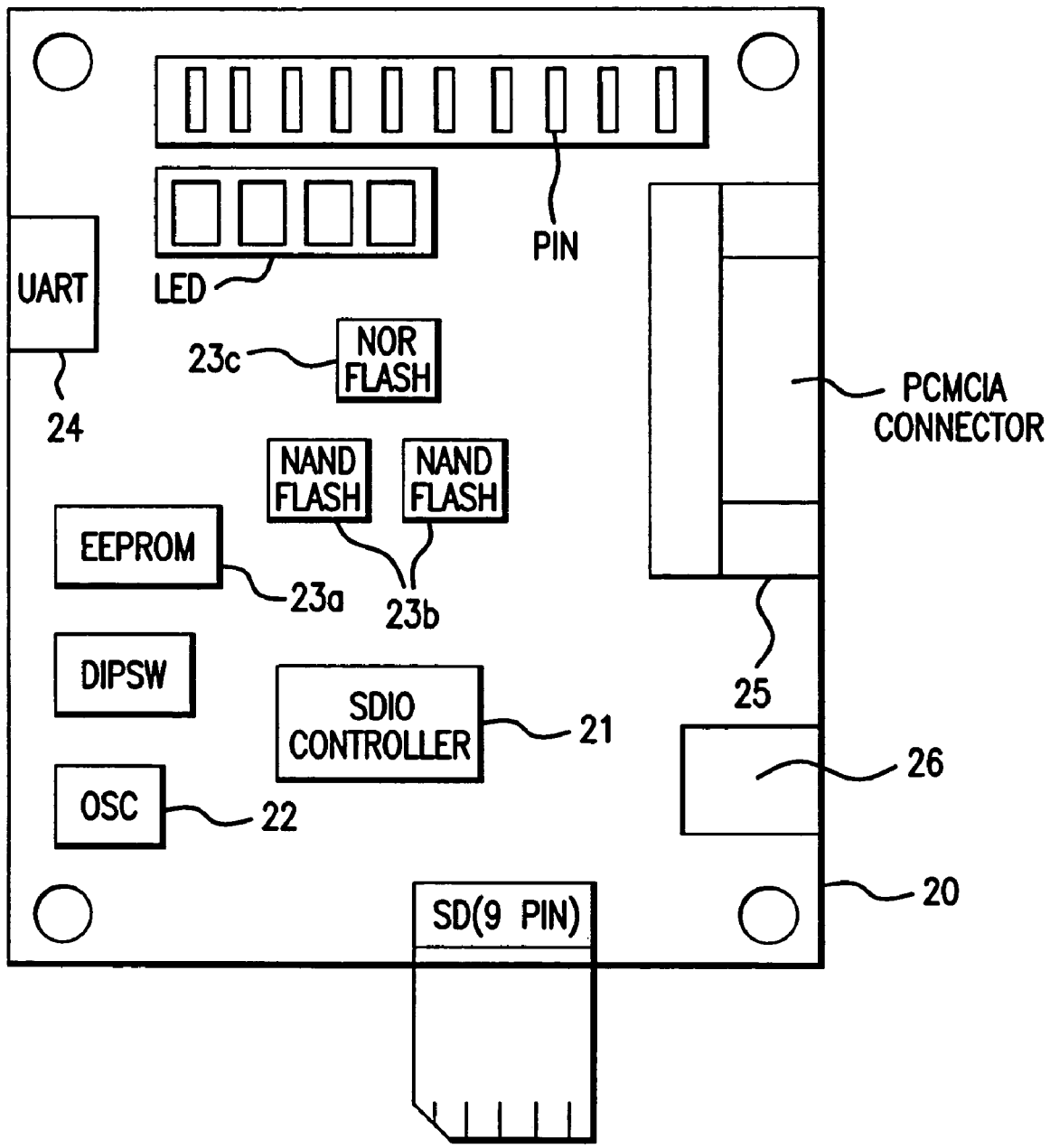
FIG. 2 is a schematic diagram showing a SDIO controller reference board 20 in accordance with one embodiment of the invention.

So far, the SDIO card development supporting system in accordance with the present invention has been described with reference to a general reference board 15b. FIG. 2 illustrates a specific example of a reference board 20, which comprises the SDIO controller 21 containing the host interface module (HIM), and the like, disposed on a single board (i.e., substrate). In this case, reference board 20 also includes the quartz oscillator 22 (abbreviated "osc" and alternatively referred to as the "clock") for driving the electronic circuitry of the board, and the memories 23a, 23b, 23c. In addition, the High Speed Universal Asynchronous Receiver Transmitter interface (abbreviated "HS-UART") of the SDIO controller 21 is an application interface operatively connecting to a UART connector 24. Likewise, the SDIO controller 21 includes a Personal Computer Memory Card International Association (PCMIA) interface that operatively connects to a PCMCIA connector 25. The SDIO controller 21 also includes a memory interface (M-IF) that is operatively connected to various memories 23a, 23b, 23c. The memories 23a, 23b, 23c interfaced with the SDIO controller 21 include the $I^2C$ serial EEPROM 23a, the NAND-type flash memory 23b, and the NOR-type flash memory 23c. The SDIO controller 21 may also include other types of application interfaces and each of these other interfaces may operatively connect to a respective application interface port disposed on the SDIO controller reference board 20. In this case, the UART connector 24 and the PCMCIA connector 25 are also defined as application interface ports. The reference board 20 may include other types of application interface ports to operatively connect to the other types of application interfaces of the SDIO controller 21. For example, reference board 20 may be provided with a General Peripheral I/O (GPIO) connector 26 operably connected to the SDIO controller 21 so that other external modules 19 can be controlled by the SDIO host device 12.

Preferably, application interfaces include a UART interface and a PCMCIA interface, although other application interfaces can be used without departing from the scope of the present invention. The SDIO interface clock timing (abbreviated as "SCLK timing") can be varied from 0 to 25 MHz using a dip switch mounted on the quartz oscillator 22.

The Illustrative Method Embodiments

The main body of the software (i.e., the SD Integrated Development Environment, abbreviated "SD-IDE") operating on the platform, such as computer 11, will now be described and represents the software component of the SDIO card development supporting system. The SD-IDE is preferably stored in a memory of the platform component of the SDIO card development supporting system. The SD-IDE implements the steps of the method embodiment in accordance with the present invention. The major functions provided by the SD-IDE include the following: (1) configuration of the SDIO host device (i.e., configuring the SDIO host device for 1-bit and 4-bit modes, time-out modes, and configuring data length modes); (2) initialization of the connection between the SDIO host device 12 and the target SDIO device (i.e., recognizing card type such as an SDIO application card 15b, or a SD memory card, or the SDIO controller reference board 15a) and interpreting commands such as CMD0, CMD5, ACMD41, CMD2, CMD3, etc.; (3) setting of SDIO host commands such as CMD52, CMD53, etc. and transmission of these commands to the target SDIO device; (4) monitoring of responses (i.e., response signals) from the target SDIO device to the host commands from the SDIO host device 12; (5) outputting of communication logs regarding communications (i.e., generating and outputting a trace report or transaction record) between the SDIO host device 12 and the target SDIO card device; and (6) testing on stress between the SDIO host device 12 and the target SDIO device (i.e., multiple transfer testing on a plurality of commands).

Figure 3:
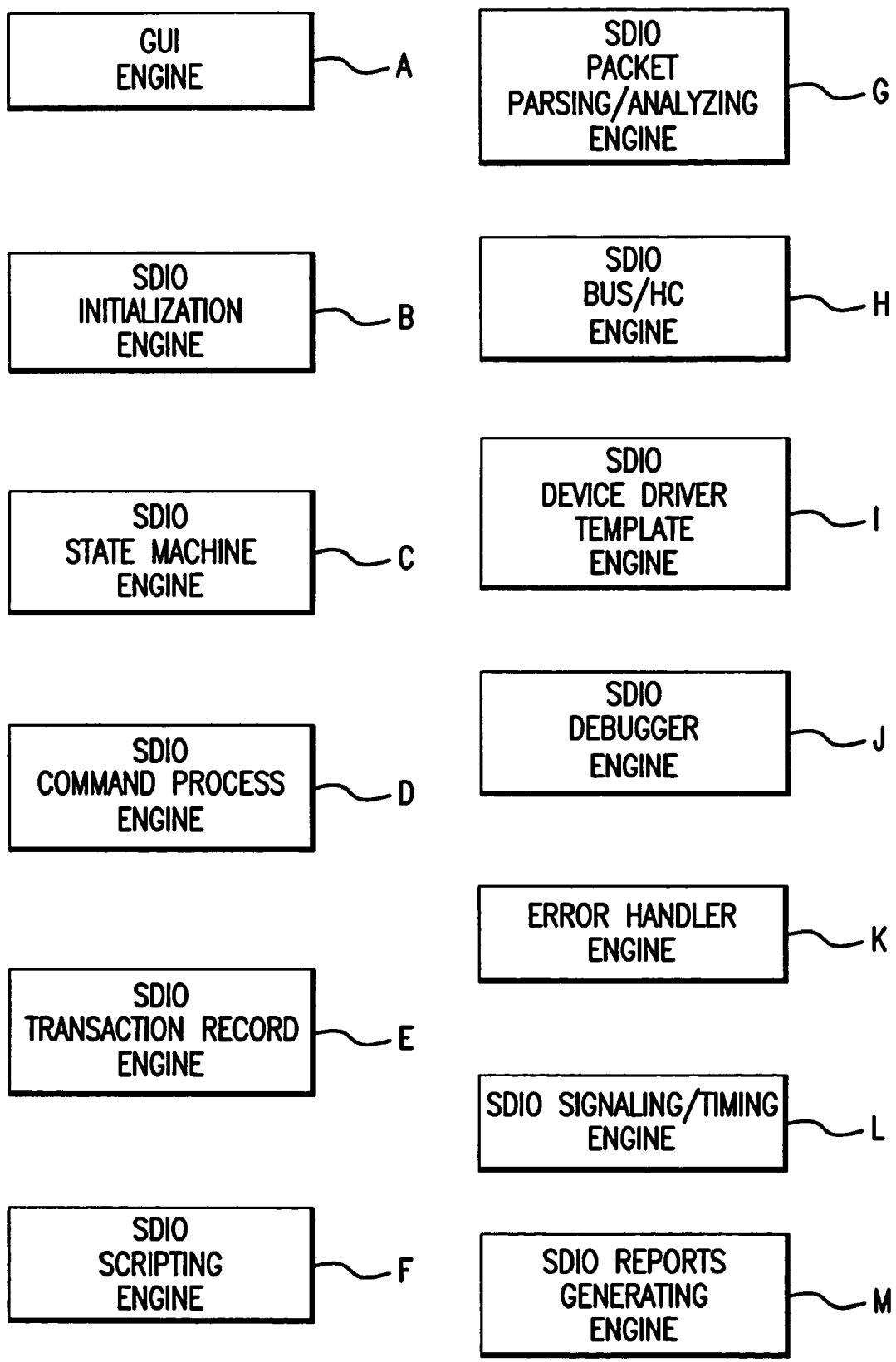
FIG. 3 is an exemplary block diagram of SD-IDE software, which illustrates the various engines carrying out steps in a method embodiment in accordance with the present invention.

The various functions, or method steps, are performed by various software modules, also referred to as "engines." FIG. 3 provides an extensive listing of various software modules (i.e., "engines") utilized in one illustrative embodiment of the SD-IDE program in accordance with the present invention. Those skilled in the art would appreciate that modifications, deletions and additions of modular engines can be provided without departing from the scope of the present invention.

The basic configuration of SD-IDE software (also referred to as "development system software") in accordance with the present invention is as follows. The development system software is engineered to include (A) target drivers, (B) a reference board driver, (C) a host board driver, (D) an Application Program Interface ("API"), and (E) Application software. These software components are modular in nature and are generally described as follows.

Target drivers are used to drive applications (i.e., SDIO standard IEEE802.11b wireless local area network (LAN) module, Bluetooth, global positioning system (GPS), personal handyphone system (PHS), flash memory, etc), such as provided in an SDIO application card. The reference board driver (also referred to as a "client driver") is used to drive the reference board (specifically, the SDIO controller 16 of the SDIO controller reference board 15a). The host board driver (also referred to as the "SDIO host driver") is used to drive the host board 13.

These three types of drivers absorb hardware barriers, (i.e., differences in the working environment attributable to hardware configuration), thereby making it possible to handle data transfer transparently. The Application Program Interface (API) is a program module for calling Dynamic Link Library (DLL) functions. The application software (e.g., basic SD-IDE applications, client driver templates for the SDIO controller, other test programs, etc.) operates on the API.

Several particular features about the basic SD-IDE software applications will also be generally mentioned. The SD-IDE software, which is application software run on the API, generally features (i) a command generator, (ii) a command analyzer, (iii) a tracer, (iv) a script language translator, and (v) other components (i.e., software engines), etc. as are desired or required for the particular application. The program system flow will be described below.

Program System Flow

Figure 4A:
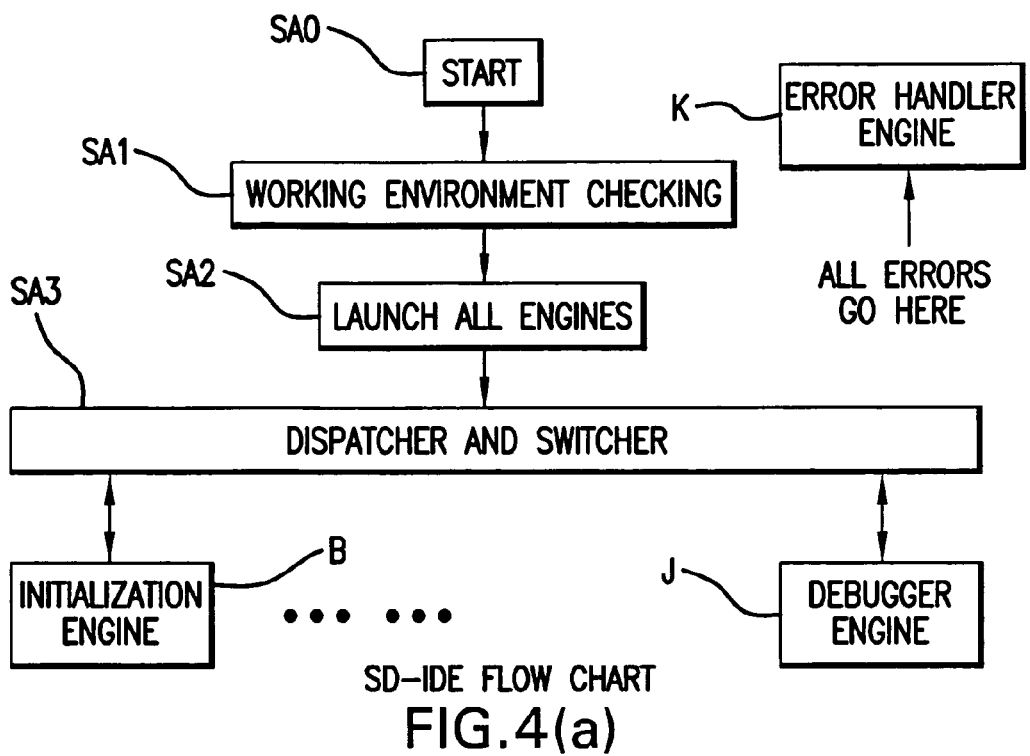
FIG. 4a is a basic flowchart of an SDIO test program in accordance with the present invention.

FIG. 4a shows the basic flowchart of the SDIO test program (SD-IDE application) in accordance with the present invention. The SD-IDE program consists of software modules (or "engines") as described above, which are linked organically. The SD-IDE program is designed so that the appropriate engines operate as required.

General steps performed by the SD-IDE program, in accordance with a method embodiment of the present invention, are as follows:

Step SA0: The program starts the SDIO card development supporting system.

Step SA1: The program checks the working environment.

Step SA2: The program launches all engines (i.e., processes or software sub-routines) necessary for operation and places certain ones in stand-by mode.

Step SA3: The program starts those interfaces that start and switch engines.

Subsequently, the engines perform the necessary processes to operate the system.

If an error occurs during the steps SA0-SA3, the error is handled by the Error Handler Engine K.

The SD-IDE is composed of the modules (or "engines") as shown in the exemplary block diagram of FIG. 3. The processes performed by the individual modules will be described below.

(A) The GUI Engine A operates a graphic user interface (GUI), which displays and controls icons and menus that are simpler for the user to use. Generally, the icons and menus are displayed on a video monitor.

(B) The SDIO Initialization Engine initializes the system. Specifically, when an SDIO card 15b, for example, is inserted in the SDIO slot 14, the SDIO host device 12 issues various commands to the SDIO controller 16 in order to identify the card 15b. The SDIO Initialization Engine B detects the inserted card 15b and reads information (i.e., serial number, card type, function, etc.) that is specific to the card 15b. The SDIO Initialization Engine B finally recognizes the SDIO card 15b in advance of further steps by reading information stored in the card 15b in accordance with technical standards (i.e., the SDIO standard). This card recognition process is referred to as "initialization."

Figure 4B:
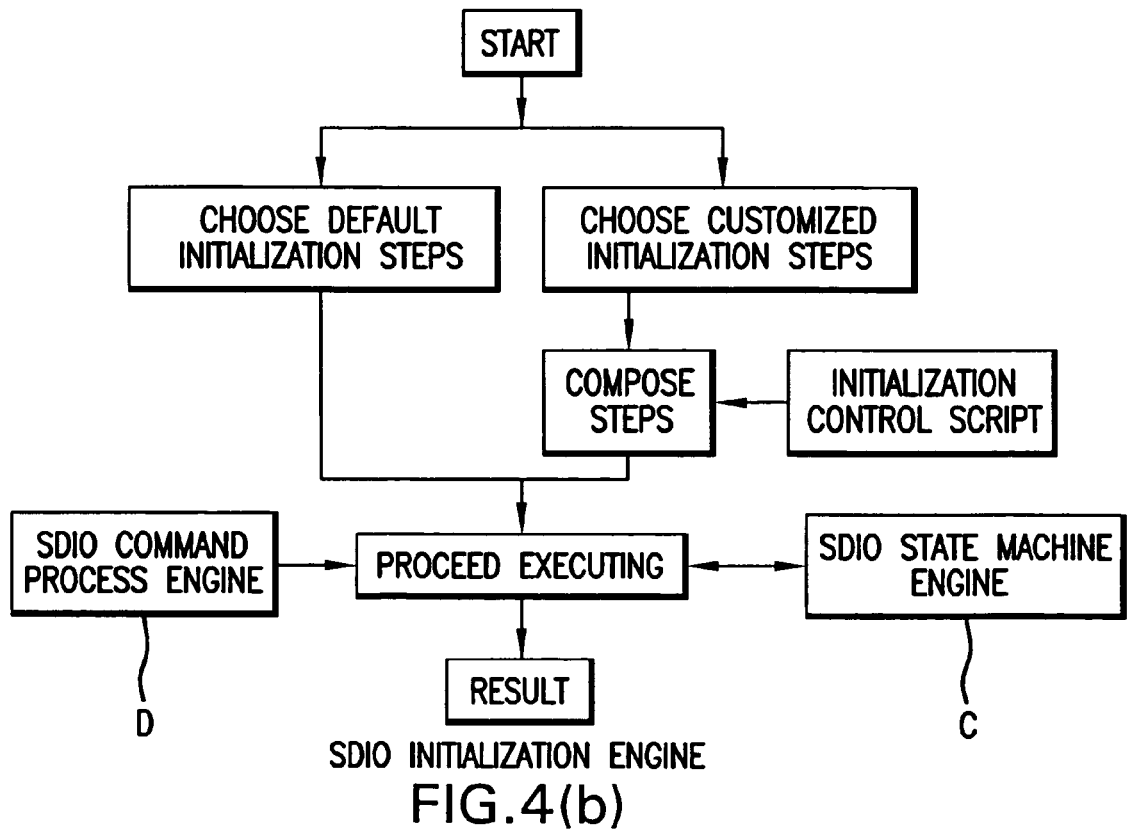
FIG. 4b is a flow diagram illustrating initialization procedures in accordance with a method embodiment of the present invention.

More specifically, FIG. 4b is a diagram illustrating the initialization procedure, such as would be performed by the Initialization Engine B of FIG. 4a. There are two types of initialization: (1) one follows general initialization steps prepared in advance (i.e., by default), and (2) the other type follows initialization steps (i.e., customized) specific to the given card. The customized type of initialization must satisfy SDIO specifications.

Generally, when initialization steps are determined, the initialization routines corresponding to these steps are executed and the results are returned. In so doing, the SDIO Command Process Engine D must issue an SDIO command at each step of the initialization routine. During the initialization process, the State machine Engine C constantly manages the issuance of commands, the reception of response information, etc., and compares behavior between the ideal machine (i.e., how the actual SDIO device ideally should behave) with the current behavior of the actual SDIO device, and generates an error signal when a difference is detected between ideal behavior and actual behavior.

Figure 5A:
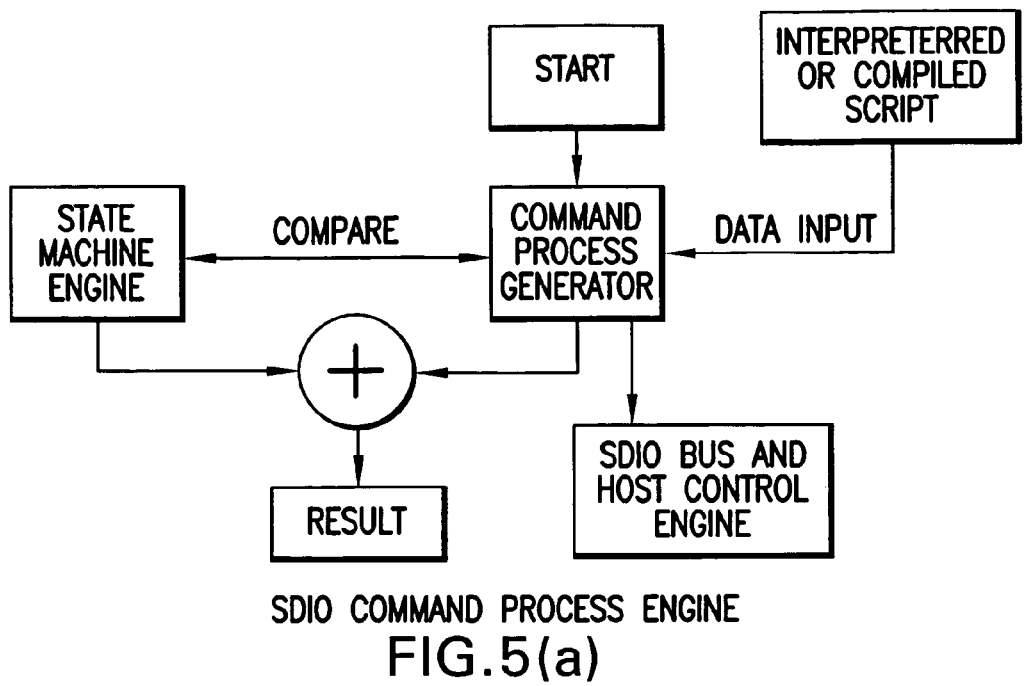
FIG. 5a is a flow diagram illustrating procedures for command processing performed by the SDIO Command Process Engine.
Figure 5B:
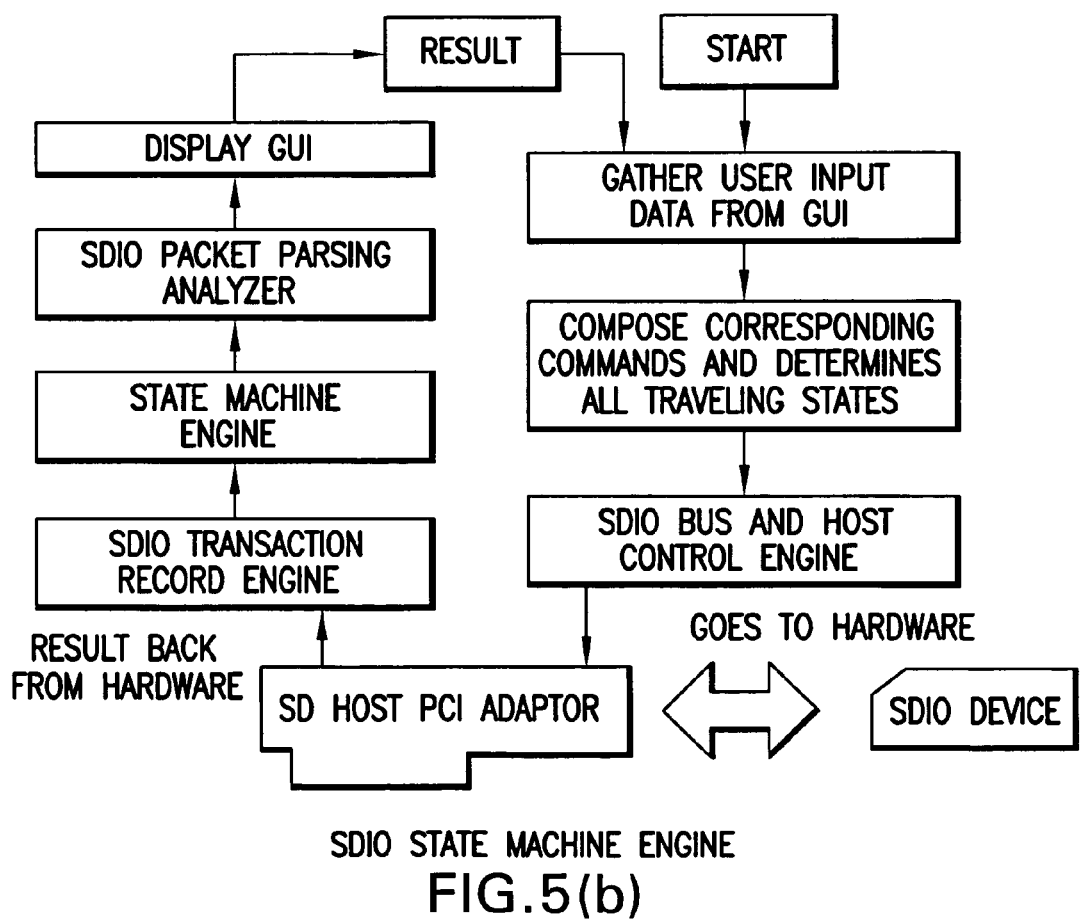
FIG. 5b is a flow diagram illustrating processing steps run by the SDIO State Machine Engine.

(C) The SDIO State Machine Engine constantly manages issuance of commands, acceptance of response information, etc., compares behavior between the ideal machine and the actual device, and generates an error signal whenever a difference between ideal machine behavior and actual device behavior is detected. FIG. 5*b* is a diagram illustrating the processing steps operated by the State Machine Engine C. The SD-IDE program in accordance with the present invention has a SDIO (spec. ver. 1.0) machine state, which is also referred to as a "transition state." For the purposes of this disclosure, the State Machine Engine C may be referred to in the alternative as the "machine state engine."

(D) The SDIO Command Process Engine generates and deciphers SDIO commands. FIG. 5*a* is a diagram illustrating procedures for command processing performed by the SDIO Command Process Engine D. The machine state changes in response to each command. The SDIO host 12 and SDIO controller of card 15*b* or of reference board 15*a* have respective states (i.e., machine states) that are independent of each other.

An illustrative example of how two independent machine states are used by the SDIO host device and the SDIO controller is provided. For example, one machine state is a bus machine and the other state machine is a function state machine. The machine bus state corresponds to the state of the bus. The machine function state corresponds to the functional state of the hardware of the system (i.e., the machine). The SDIO host 12 stores the present machine bus state, and the SDIO controller of the SDIO application card 15*b*, or alternatively of the reference board 15*a*, stores the present function machine state.

The bus machine state communicates with the SDIO host device 12, which stores the bus state. There are four bus states: (1) the Initialization state, (2) the Stand-by state, (3) the Command state, and (4) the Transfer state. The bus state changes depending on the command received by the SDIO host device 12. The function state machine stores function states such as "Execute Ready" states, Interrupts, states communicating with machine card function, and control states.

In each machine state, the SDIO card development supporting system always transitions with an expectation of receiving certain information. The SD-IDE program component of this system determines when to issue commands and when to receive responses by checking the machine state. If the SD-IDE program transitions the hardware of the system to an unexpected state, the SD-IDE program returns an error or rejects the card (or the reference board), thereby regarding the error generating transition process as illegal.

Figure 6A:
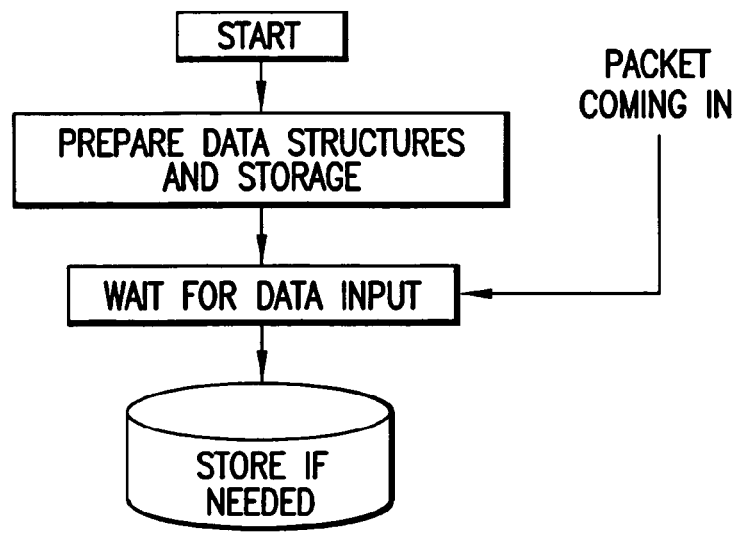
FIG. 6a is a flow diagram illustrating processing steps run by the SDIO Transaction Record Engine.

(E) The SDIO Transaction Record Engine records the transaction history of the SDIO bus. FIG. 6*a* is a diagram illustrating the processing steps operated by SDIO Transaction Record Engine E.

Sophisticated analysis, including time management, is possible when all packets received by the SDIO host are time-stamped by a clock timer. For example, as with a logic analyzer, timing charts can be displayed to help perform efficient debugging.

The SD bus supports (i.e., transmits, receives, or transfers) three types of packets: (1) commands from the SDIO host device 12 to the SDIO controller, (2) responses from the SDIO controller to the SDIO host device 12, and (3) transfer data. By recording all these packets as data, the packets can be parsed and analyzed later to trace sequences of events. This recording process makes it possible to perform debugging processes later.

(F) The SDIO Scripting Engine operates a scripting process. The SDIO scripting language makes it possible to describe various data transfer processes and to execute them in batches. This description of data transfer processes and execution in batches, in turn, makes it possible to implement capabilities for translating edit screens and scripts. The SDIO Scripting Engine F is implemented in supporting both interpreter and compiled type.

Figure 6B:
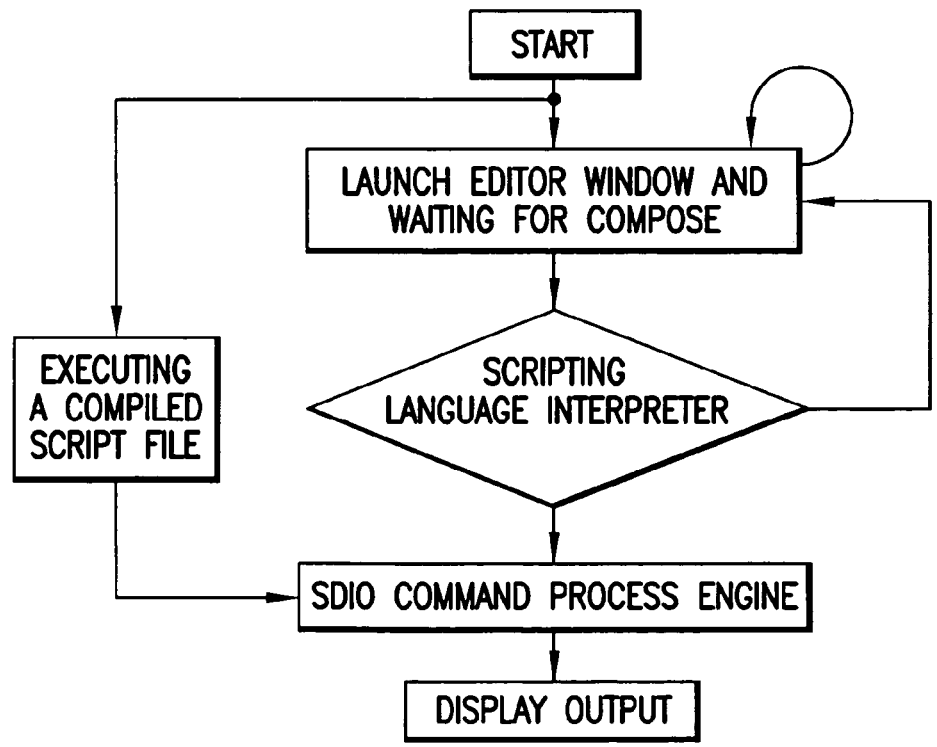
FIG. 6b is a flow diagram illustrating processing steps run by the SDIO Scripting Engine.

FIG. 6*b* is a diagram illustrating processing steps operated by SDIO Scripting Engine F. Processes providing overall SDIO evaluations and tests are edited, and generated, using defining scripts (i.e., processes coded into micro commands or routines). Basically, the SDIO Scripting Engine F utilizes a script interpreter to translate commands written in a scripting language into SDIO commands, and vice versa. Or, the SDIO Scripting Engine F compiles the script into a compiled-type script, which is ready for executing or storing for later usage.

Figure 7A:
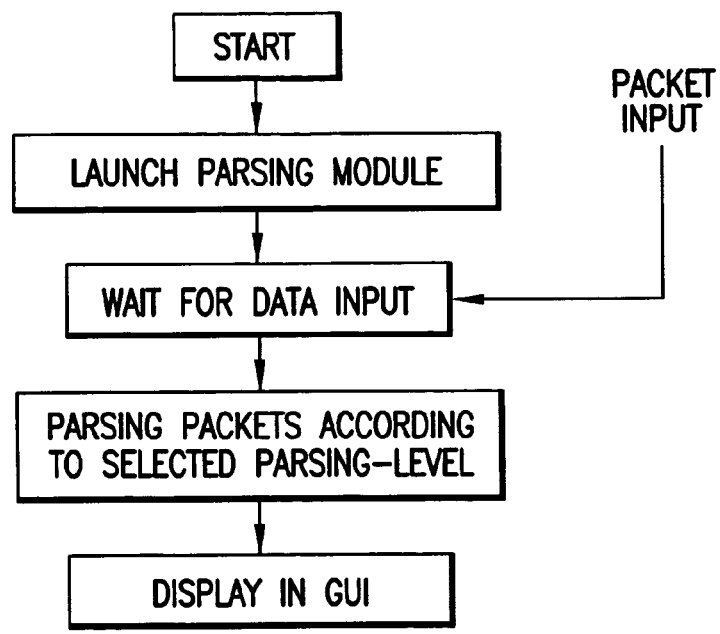
FIG. 7a is a flow diagram illustrating processing steps run by the SDIO Packet Parsing/Analyzing Engine.

(G) The SDIO Packet Parsing/Analyzing Engine parses and analyzes transferred data. Specifically, FIG. 7*a* is a diagram illustrating processing steps operated by the SDIO Packet Parsing/Analyzing Engine G. Generally, data transferred on the SD bus is a mere series of digits "0" and "1." Transferred data on the SD bus is treated as a packet, and parsed/analyzed, to determine who sent what packet and to determine what format each packet is in. This parsing and analysis is done by the SDIO Packet Parsing/Analyzing Engine G in order to classify the packets on the SD bus by type (i.e., whether the packet is a command, a response, or data), by source, and by destination, and thereby to permit displaying of the parsed and analyzed data in an easy-to-understand manner.

(H) The SDIO Bus/Host Controller Processing Engine H controls the SDIO host controller and thereby controls commands and the like issued to the SD bus.

(I) The SDIO Device Driver Template Processing Engine I is a device control program connected to the SDIO controller. The SDIO Device Driver Template Processing Engine I serves as a procedure template for developers.

Figure 7B:
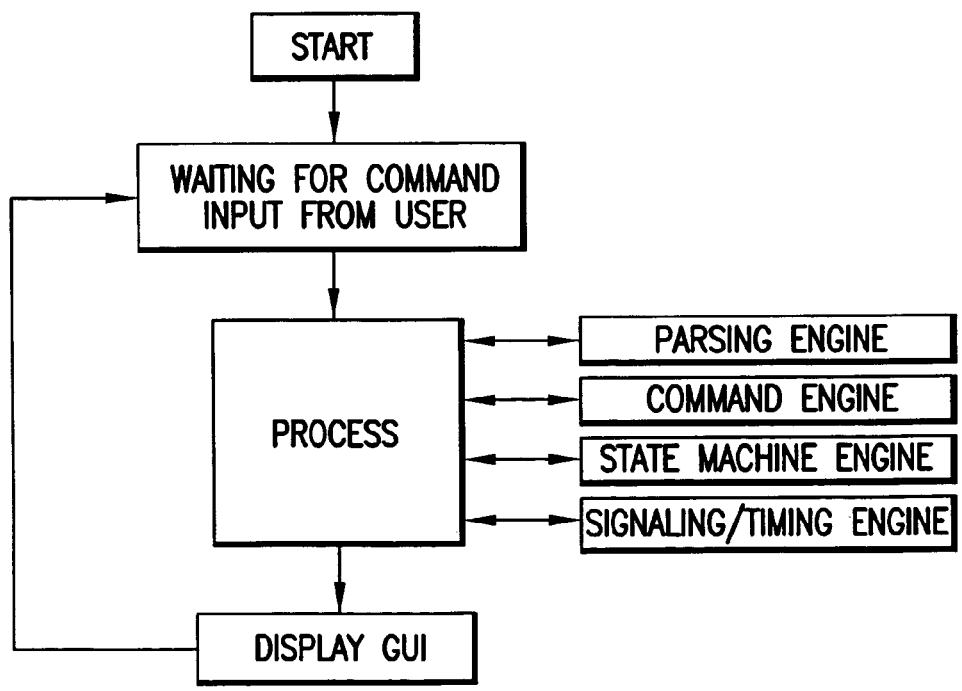
FIG. 7b is a flow diagram illustrating processing steps run by SDIO Debugger Engine.

(J) The SDIO Debugger Engine operates the debugger. Specifically, FIG. 7*b* is a diagram illustrating processing steps operated by SDIO Debugger Engine J. The user starts the debugger and specifies the part and content of the SD-IDE program the user desires to debug (i.e., analyze). Based on the user input, internal information (i.e., status, error, data, etc.) is classified and displayed, and the Parsing Engine G and/or the Command Engine D are started as required. Finally, the internal information is displayed on the GUI, and modified at the source code level if necessary.

(K) The Error Handler Engine K handles all errors.

(L) The SDIO Signaling/Timing Engine L handles signaling/timing. This signaling/timing software module is responsible for commanding either the SDIO reference board 15*a* or 20, or the SDIO target device 19 operably connected to or attached to the SD reference board, to generate requested signals for SDIO signaling tests and verifications. The SDIO Signaling/Timing Engine L also collects the timing of all of these requested signalings. For example, the SDIO Signaling/Timing Engine L commands the operably connected or attached external device 19 to generate an interrupt or to send data to the SD reference board 15*a* or 20.

(M) The SDIO Reports Generating Engine M handles generating reports. The SDIO Reports Generating Engine M operates to generate a popular report format using recorded data in order to provide a report format that is much easier to read than the recorded data without such report formatting.

As described above, the reference board 15*b* or 20, and the remaining portions of the SDIO card development supporting system provides an SDIO design and development tool in accordance with the present invention. This SDIO design and development tool provides an efficient application development environment, making it possible to carry out SDIO development/engineering consistently from an SDIO host to target applications. Also, the SDIO design and development tool provided by the SDIO card development supporting system of the present invention makes it possible to design and develop SDIO application cards and SDIO memory cards in a short period of time. Furthermore, the SDIO card development supporting system in accordance with the present invention is flexible and can be modified to account for future changes in SDIO standards and other wireless communication standards.

While the present invention has been described with reference to certain illustrative embodiments, one of ordinary skill in the art will recognize that additions, deletions, substitutions, modifications and improvements can be made while remaining within the spirit and scope of the present invention as defined by the appended claims.

What is claimed is:

1. An SDIO card development supporting system for development of SDIO cards, the system comprising:
   (a) a hardware component comprising:
      (i) a platform having an operating system and a memory operably connected to the operating system;
      (ii) an SD host board including an SDIO host device;
      (iii) a first bus operably connecting the operating system of the platform to the SD host board; and
      (iv) an SDIO controller reference board equipped with an SDIO port operably connectable to the SDIO host device via a SD bus; and
   (b) a software component stored in the memory of the platform, wherein the software component comprises an SDIO test program that runs on the operating system of the platform, wherein the reference board comprises
      (i) a substrate;
      (ii) an SDIO controller disposed on the substrate and equipped with a plurality of application interfaces;
      (iii) a quartz oscillator operably connected to the SDIO controller; and
      (iv) a plurality of application interface ports operably connected to the SDIO controller, wherein the SDIO controller further comprises a host interface module that operably connects the SDIO controller to the SD bus when the SDIO port is operably connected to the SDIO host device, and wherein the plurality of application interfaces includes a HS-UART interface and a PCMCIA interface, and the plurality of application interface ports includes a HS-UART connector and a PCMCIA connector, wherein the HS-UART interface is operably connected to the HS-UART connector and the PCMCIA interface is operably connected to the PCMCIA connector.

2. A system as recited in claim 1, wherein the platform is a computer.

3. A system as recited in claim 1, wherein the SDIO test program operates to generate commands, analyze commands, trace commands, and perform debugging for the SD host device.

4. A system as recited in claim 3, wherein the SDIO test program also operates a language script interpreter in order to describe generated commands, analyzed commands, traced commands, and debugging performed by the SDIO test program.

5. A system as recited in claim 1, wherein the SDIO test program comprises: a command generator; a command analyzer; a tracer; and a language script interpreter.

6. An SDIO controller reference board equipped with an SDIO port operably connectable to an SDIO host device via an SD bus, the reference board comprising:
   (a) a substrate;
   (b) an SDIO controller disposed on the substrate and having a plurality of application interfaces;
   (c) a quartz oscillator operably connected to the SDIO controller; and
   (d) a plurality of application interface ports operably connected to the SDIO controller, wherein the plurality of application interfaces includes a HS-UART interface and a PCMCIA interface, and the plurality of application interface ports includes a HS-UART connector and a PCMCIA connector, wherein the HS-UART interface is operably connected to the HS-UART connector and the PCMCIA interface is operably connected to the PCMCIA connector.

7. An SDIO controller reference board as recited in claim 6, wherein the SDIO controller further comprises a host interface module that operably connects the SDIO controller to the SD bus when the SDIO port is operably connected to the SDIO host device.

8. An SDIO controller reference board as recited in claim 7, wherein the SDIO controller further comprises a memory interface, and the reference board further comprises one or more memory units operably connected to the memory interface.

9. An SDIO controller reference board as recited in claim 8, wherein the one or more memory units are selected from the group consisting of an $I^2C$ serial EEPROM unit, a NAND-type flash memory and a NOR-type flash memory.

10. An SDIO controller reference board as recited in claim 8, wherein each application interface of the SDIO controller is operably connected to a respective one of the plurality of application interface ports.

11. A method of operating an SDIO card development supporting system, wherein the system comprises an SD integrated development environment software program operating on a computer platform and the computer platform comprises a memory storing the software program and a SDIO host device, the method comprising the steps of:
   (a) starting the SDIO card development supporting system using the software program and optionally checking a work environment;
   (b) launching one or more engines of the software program;
   (c) initializing the system using the software program when an SDIO card unit, having an SDIO controller reference board comprising an SDIO controller, is inserted into an SDIO slot of the computer platform so as to operably connect the SDIO controller to the SDIO host device, wherein the SDIO controller reference board comprises
      (i) a substrate, wherein the SDIO controller is disposed on the substrate and has a plurality of lapplication interfaces;
      (ii) a quartz oscillator operably connected to the SDIO controller; and
      (iii) a plurality of application interface ports operably connected to the SDIO controller, wherein the plurality of application interfaces includes a HS-UART interface and a PCMCIA interface, and the plurality of application interface ports includes a HS-UART connector and a PCMCIA connector, wherein the HS-UART interface is operably connected to the HS-UART connector and the PCMCIA interface is operably connected to the PCMCIA connector; and (d) generating an SDIO command using the software program in order to test the operable connection between the SDIO host device and the SDIO controller.

12. A method as recited in claim 11, wherein the software program comprises an SDIO initialization engine and an SDIO command process engine, and initializing of the system is performed by the SDIO initialization engine and generating the SDIO command is performed by the SDIO command process engine.

13. A method as recited in claim 11, further comprising the steps of:
(e) comparing behavior of the SDIO controller of the SDIO card unit to behavior of an ideal SDIO controller stored in memory of the computer platform; and
(f) generating an error signal when a difference between the behavior of the SDIO controller of the SDIO card unit and the behavior of the ideal SDIO controller is detected.

14. A method as recited in claim 11, wherein the operable connection between the SDIO host device and the SDIO controller is provided by an SD bus of the computer platform, and the method further comprises the steps of:
(e) recording a transaction history of packets supported by the bus; and
(f) parsing and analyzing the transaction history in order to debug the software program when the SDIO card unit is a SDIO controller reference board.

15. A method as recited in claim 11, wherein the operable connection between the SDIO host device and the SDIO controller is provided by an SD bus of the computer platform, and the method further comprises the steps of:
(e) recording a transaction history of packets supported by the bus; and
(f) parsing and analyzing the transaction history in order to debug the SDIO card unit when the SDIO card unit is an actual SDIO card.

16. An SDIO card development supporting system for development of SDIO cards, the system comprising:
(a) a hardware component comprising:
(i) a platform having an operating system and a memory operably connected to the operating system;
(ii) an SD host board including an SDIO host device;
(iii) a first bus operably connecting the operating system of the platform to the SD host board; and
(iv) an SDIO controller reference board equipped with an SDIO port operably connectable to the SDIO host device via an SD bus; and
(b) a software component stored in the memory of the platform, wherein the software component comprises an SDIO test program that runs of the operating system of the platform, wherein the reference board comprises
(i) a substrate;
(ii) an SDIO controller disposed on the substrate and equipped with a plurality of application interfaces;
(iii) a quartz oscillator operably connected to the SDIO controller; and
(iv) a plurality of application interface ports operably connected to the SDIO controller, wherein the plurality of application interfaces includes a HS-UART interface and a PCMCIA interface, and the plurality of application interface ports includes a HS-UART connector and a PCMCIA connector, wherein the HS-UART interface is operably connected to the HS-UART connector and the PCMCIA interface is operably connected to the PCMCIA connector.

* * * * *